UNITED STATES PATENT OFFICE.

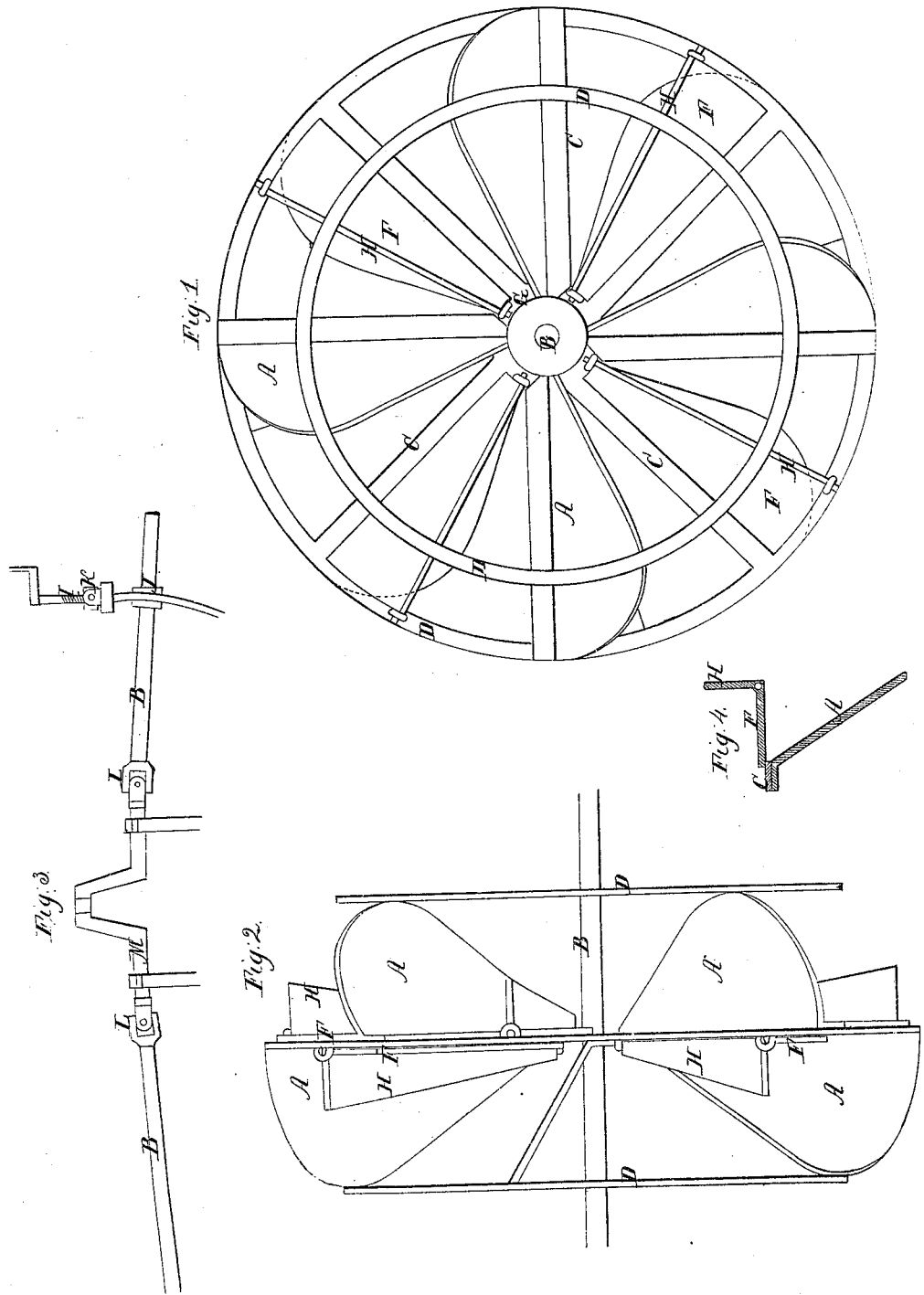

JACOB C. CARNCROSS, OF PHILADELPHIA, PENNSYLVANIA.

IMPROVED VALVE OR GATE FOR OBLIQUE-FLOAT PADDLE-WHEELS.

Specification forming part of Letters Patent No. 9,012, dated June 15, 1852.

*To all whom it may concern:*

Be it known that I, JACOB C. CARNCROSS, of the city and county of Philadelphia, and State of Pennsylvania, have invented a new and useful Improvement in Oblique Paddle-Wheels for Propelling Vessels, which is described as follows, reference being had to the annexed drawings of the same, making part of this specification.

Figure 1 is a side elevation of a paddle-wheel with the improvement attached. Fig. 2 is a top or bird's-eye view of the same. Fig. 3 is a front elevation of the apparatus for raising and lowering the wheels to regulate their dip in the water. Fig. 4 is a section of one of the oblique paddles and winged gates for preventing the lateral movement of the water by the paddles.

Similar letters in the figures refer to like parts.

The nature of this invention consists in placing at the edges next each other of the obliquely-arranged paddles of the wheel a series of radial gates turning on journals and having right-angled wings at their axes for keeping them closed when they pass through the water, to prevent the water being moved laterally by the oblique paddles.

To enable others skilled in the art to make and use my invention, I will proceed to describe its construction and operation.

The oblique paddles A of the wheel may be arranged at any desired angle in relation to the line of the shaft B, and are made curved on their outer edges so as to somewhat resemble in form the wings of a bird, and have flanges at their straight or inner edges next each other, by which they are firmly secured to the slightly-tangential arm C of the shaft. They are further secured by circular rims D, fastened to the ends of radial arms and to their curved edges, and by any suitable additional means. Immediately in advance of the straight edges of the oblique paddles and on the opposite side of the center circular rim to that on which the paddles are situated are arranged a series of radial gates F, equal in number to the number of paddles, which gates taper inward from the rim to the hub G on the shaft, and are attached to said rim and hub by journals moving in eyes or boxes on the same, so as to enable them to be opened and brought at right angles with the rim when occasion requires, as will be hereinafter stated. The outer ends of these gates are about one-half the width of the paddles, and the journals upon which they turn are at the parts farthest in advance of the straight edges of the paddles, to which parts are secured a series of wings H, extending at right angles to their surfaces from the oblique paddles, opposite which they are situated, a sufficient distance to form resisting-surfaces to the water, as they pass through the same, greater than the lateral force of the water created by the oblique paddles exerted on the gates F, so as to prevent its lateral movement. The wheels thus constructed are secured on the shafts B, and these shafts are supported at their outer ends in boxes J, placed in guides formed in slots in the sides of the vessel, which boxes are suspended by ball-joints to screw-rods I, passing through oscillating nuts K, resting on journals in the side of the vessel. The inner ends of the shafts B are attached by universal joints L to the extremities of the main driving-shaft M, to which the power of the steam-engine is directly applied. By having the shafts B of the wheels distinct from the main driving-shaft M and attaching them together by the universal joints the wheels can be raised or lowered in the water to give less or greater dip to the paddles, as the amount of freight on the boat to which the wheels are applied may require, without altering the position of the main driving-shaft from its horizontal line with the piston-rod of the steam-engine. Where the application is made to a canal-boat this advantage is considered indispensable, as the difference in lading at times occasions a difference in draft in many cases of four feet.

In the revolution of the wheels the oblique paddles A will from their peculiar position be caused to enter and depart from the water at acute angles, corresponding with the angles upon which they are arranged in relation to the lines of their shafts B, and from this fact will not produce as much tremor or shock to the vessel on their entrance nor raise the quantity of water as they depart, nor create as large swells or waves as the ordinarily-arranged paddles. As they pass through the water they will have a tendency to force a portion of the water next their surfaces laterally toward the arms of the wheel, to which the center rim is secured. This movement of the water will be partially prevented by the radial gates F, which are kept closed during their movement through the water by the action of the water on the right-angled wings H, which assist in the propulsion of the vessel, the width or superficial area of that part of the wings against which the water acts being sufficient to overcome the lateral pressure on the radial gates, and consequently to keep them closed. As the oblique paddles approach the terminus of their action and commence leaving the water, the pressure on the wings will gradually cease and the lateral action and gravity of the water from the oblique paddles will open the gates and pass through the spaces previously closed by the same and thus be prevented from being thrown upward abaft the wheel.

Having thus fully described my invention, what I claim as new, and desire to secure by Letters Patent, is—

1. The series of radial winged and pivoted gates F for preventing the water acted on by the paddles being moved laterally as they move through the water and opening to deliver the water freely at the proper time, arranged and operating substantially as described.

2. The employment of the universal joints, combined with the sliding boxes moving in guides at the sides of the vessel, for enabling the wheels to be raised or lowered to regulate their dip in the water without altering the position of the main driving-shaft, as described.

J. C. CARNCROSS.

Witnesses:
JOHN RANKIN,
JAMES MONTGOMERY.